United States Patent

[11] 3,627,838

[72] Inventors: Stephan Ilnyckyj, Islington, Ontario; John L. Tiedje, Sarnia, Ontario; Frank P. Gielzecki, Sarnia, Ontario, all of Canada
[21] Appl. No.: 779,555
[22] Filed: Nov. 27, 1968
 Continuation-in-part of Ser. No. 417,680, Dec. 11, 1964, abandoned.
[45] Patented: Dec. 14, 1971
[73] Assignee: Esso Research and Engineering Company

[54] PROCESS FOR MANUFACTURING POTENT POUR DEPRESSANTS
 2 Claims, 1 Drawing Fig.
[52] U.S. Cl. .................................................. 260/87.3
[51] Int. Cl. .................................................. C08f 15/02, C08f 25/00, C08f 37/00
[50] Field of Search ............................................. 260/87.3

[56] References Cited
UNITED STATES PATENTS

| | | | |
|---|---|---|---|
| 3,093,623 | 6/1963 | Ilnyckyj .................. | 260/87.3 |
| 3,131,168 | 4/1964 | Ilnyckyj et al. ........... | 260/87.3 |
| 3,250,714 | 5/1966 | Ilnyckyj et al. ........... | 252/56 |
| 3,254,063 | 5/1966 | Ilnyckyj .................. | 260/87.3 |

Primary Examiner—Joseph L. Schofer
Assistant Examiner—A. Holler
Attorneys—Pearlman and Stahl and Frank T. Johmann ABSTRACT: A method of producing copolymers of ethylene and 28 to 60 weight percent vinyl acetate of 2,000 to 6,000 mol weight for use as pour depressants by charging solvent, vinyl acetate and ethylene to a reactor until the concentration of vinyl acetate in said solvent is 6 to 10 weight percent and the pressure is 700 to 2000 p.s.i., heating to 280° to 340° F. and then adding promoter to start the polymerization and thereafter adding additional promoter and vinyl acetate to maintain the concentration of vinyl acetate in the 6 to 10 weight percent range during the course of the reaction.

EFFECT OF VINYL ACETATE CONVERSION ON POTENCY OF POUR DEPRESSANT 0.015 WT. % COPOLYMER IN 50/50 VIRGIN-CRACKED GAS OIL BLEND, ASTM POUR 25°F

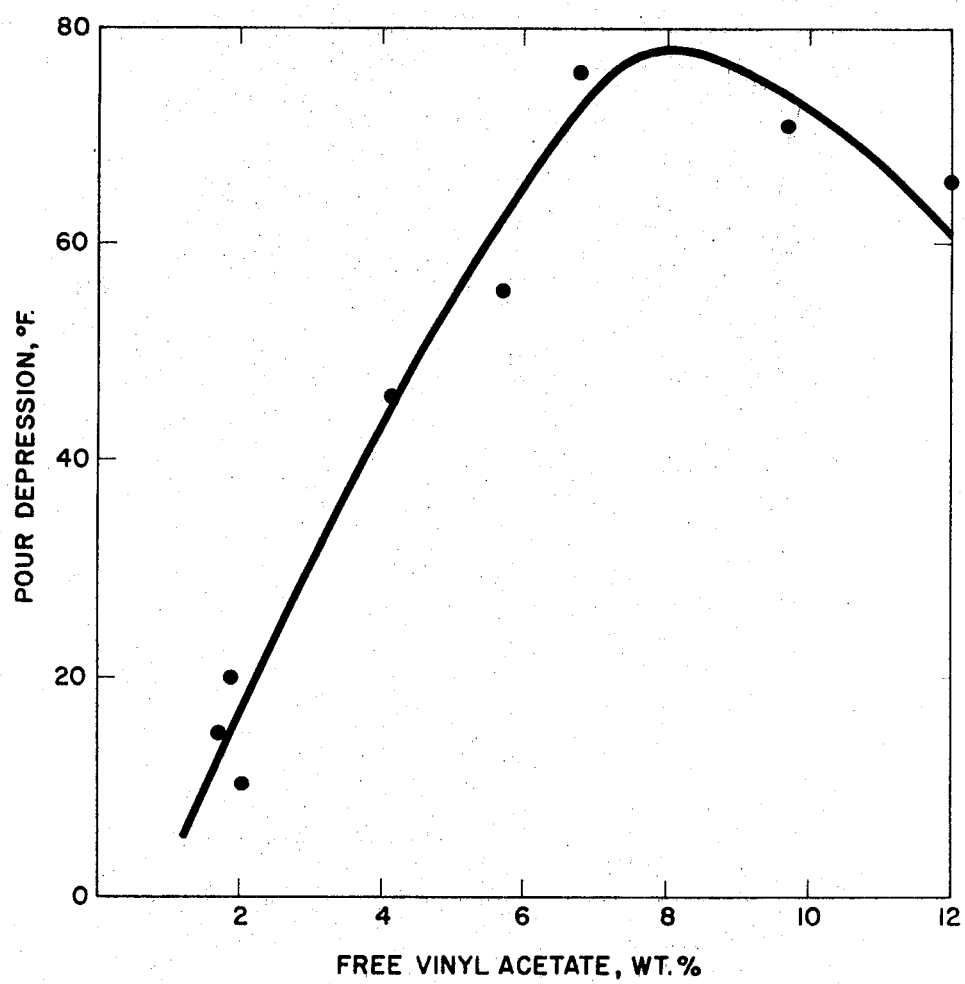

PROCESS FOR MANUFACTURING POTENT POUR DEPRESSANTS

This application is a Continuation-in-part of our prior application, Ser. No. 417,680, filed Dec. 11, 1964 and now abandoned.

THE INVENTION

The present invention is broadly concerned with a multipurpose additive for improving the quality of middle distillates. The present invention relates to improving the flow at low temperatures and the pour characteristics and rust preventive characteristics of middle distillates. More particularly, the present invention relates to the manufacture of improved pour depressants for use with these middle distillates, in particular, heating oils and diesel fuels, kerosene, aviation turbojet fuels, and other fuels that are subject to low temperatures. The multipurpose additive of the present invention is a copolymer of ethylene and vinyl acetate, which copolymer has a unique molecular configuration and contains a relatively high concentration of vinyl acetate in the copolymer.

With the increase in the use of hydrocarbon fuels of all kinds, a serious problem has arisen in areas frequently subjected to low temperatures in the cold characteristics of these fuels. Particularly, serious problems have been encountered by heating oils, diesel oils and jet fuels that have too high a pour point, resulting either in distributional or operating difficulties or both. For example, the distribution of heating oil by pumping or syphoning is rendered difficult or impossible at temperatures around or below the pour point of the oil. Furthermore, the flow of the oil at such low temperatures through the filters cannot be maintained, leading to the operating failure of the equipment.

Particularly the low temperature properties of petroleum distillate fuels boiling in the range between about 250° and about 750° F. have attracted increasing attention in recent years because of the growth of markets of such fuels in subarctic areas and also because of the development of turbojet aircraft capable of operating at altitudes where temperatures of −50° F. or lower may be encountered.

Thus it is one object of the present invention to provide heating oils, diesel fuel oils, kerosenes and jet fuels having low pour points. Aviation turbojet fuels in which the polymers of the present invention may be used normally boil between about 250° and about 550° F. and are used in both military and civilian aircraft. Such fuels are more fully defined by U.S. Military Specifications MIL-F-5624C, MIL-F-25554A, MIL-F-25558A, and amendments thereto. Kerosenes and heating oils will normally have boiling ranges between about 300° and about 750° F. and and are more fully described in ASTM Specification D-396-48T and supplements thereto, where they are referred to as No. 1 and No. 2 fuel oils. Diesel fuels in which the polymers may be employed are described in detail in ASTM Specification D-975-35T and later versions of the same specification.

The polymeric pour depressants may, in accordance with the invention, be employed in conjunction with a variety of other additives commonly used in fuels such as those set forth above. Typical of such additives are rust inhibitors, antiemulsifying agents, corrosion inhibitors, antioxidants, dispersants, dyes, dye stabilizers, haze inhibitors, antistatic agents and the like. It will frequently be found convenient to prepare additive concentrates for use in the various types of fuels and thus add all of the additives simultaneously.

In essence, the present invention is an extension and improvement of the invention disclosed in U.S. Pat. Nos. 3,048,479 issued Aug. 7, 1962, inventors Ilnyckyj et al. and 3,093,623 issued June 11, 1963, Ilnyckyj. In the processes and polymers described in these patents, it was found that the potency of the additive was substantially lessened when the vinyl acetate in the copolymer exceeded about 28 to 30 weight percent.

In essence, the additive of the present invention consists essentially of an ethylene-vinyl acetate copolymer having a vinyl acetate concentration in the range of about 28 to 60 weight percent, preferably having a vinyl acetate concentration in the range from about 35 to 45 weight percent vinyl acetate. The molecular weight of the copolymer is in the range from about 2000 to 6000, preferably in the range from about 3000 to 5000. The molecular weights are determined by K. Rast's method (Ber. 55, 1051, 3727 (1922)).

The ethylene-vinyl acetate copolymer as described in the present invention is used in the base oil in a concentration in the range from about 0.001 to 0.2 percent by weight, preferably in the concentration in the range from about 0.005 to 0.1 percent by weight.

In accordance with the present invention, the polymerization process is conducted in a solvent such as benzene. The initiator comprises any peroxide compound, preferably ditertiary butyl peroxide. The temperature of the copolymerization reaction is preferably in the range from about 280° to 340° F. A very desirable temperature is about 300° F. The pressure is preferably in the range from about 700 to 2000 lbs., most preferably about 800 to 1000 lbs. The autoclave or similar equipment containing the solvent and vinyl acetate is usually purged with nitrogen, then with ethylene, before charging with sufficient amounts of ethylene to yield the desired pressure when heated to the reaction temperature. During the copolymerization, additional ethylene is added to maintain the pressure at the desired level. In general, the copolymerization is considered complete when the pressure drops less than 50 p.s.i.g. per hour. The product is stripped free of solvent and unreacted vinyl acetate under vacuum.

In accordance with the present invention, it was found that if the reaction or process conditions are controlled within certain limits a very desirable type of structure or molecular configuration in the polymer is secured, which desired structure is not secured in the process and polymer described in the patents referred to. By controlling the reaction conditions in accordance with the present invention, secondary reactions are prevented such as excessive branching and crosslinking. Thus the copolymers of the present invention have a particular type of structure wherein said copolymers have about 28 to 60 weight percent, preferably 35 to 45 percent by weight of vinyl acetate as compared to the ethylene. With copolymers of this structure and these concentrations of vinyl acetate, unexpected desirable results are secured.

In accordance with the present invention, it was unexpectedly found that high potency pour depressants comprising copolymers of ethylene and vinyl acetate are produced when the reaction medium contains from about 4 to 12 weight percent, preferably about 6 to 10 weight percent of free vinyl acetate during the entire copolymerization reaction. Therefore, it is preferred that this concentration of free vinyl acetate be maintained in this range from the initial polymerization start until the polymerization is complete for optimum effectiveness.

A preferred method to produce the desired concentration of vinyl acetate in the copolymer and desired structure of the copolymer is to first charge benzene and then vinyl acetate to the reactor to secure a concentration of vinyl acetate in the benzene in the range of from about 4 to 12 percent by weight, preferably about 6 to 10 percent by weight. Ethylene is added to the reaction zone which is heated until the temperature is in the range from about 280° to 340° F., preferably about 310° F., and pressure is in the range of about 600 to 2000, preferably about 600 to 1200 lbs., e.g., about 900 lbs. When these copolymerization conditions are attained, additional vinyl acetate is added with the promoter such as di-t-butyl peroxide. As the reaction proceeds, the pressure is maintained in the reaction zone, e.g., about 900 lbs., by the continuous addition of ethylene. By maintaining the free vinyl acetate concentration in the solvent in the range specified, namely 4 to 12 percent by weight, preferably about 6 to 10 percent by weight, the copolymer product will have a vinyl acetate concentration in the range of about 28 to 60 percent by weight and generally is in the range from about 35 to 45 percent by weight, the remainder being ethylene.

While the preceding is a preferred method, various modifications in the process can be made. For example, one can start the reaction before the temperature is at 280° F. Thus, in order to maximize production, in some instances it may be desirable to add the promoter and start the reaction while the heating-up is still occurring, e.g., at 250° F., and then continue heating until the temperature is in the 280° to 340° F. range, and thereafter maintaining the temperature in the 280° to 340° F. range for the bulk, e.g., 80 percent or more, of the reaction. As a further modification, one can charge the vinyl acetate to the reactor first, and then add the benzene, or one can add a mixture of vinyl acetate and benzene to the reactor, etc.

The present invention may be more fully understood by the following examples illustrating the same.

EXAMPLE 1

A copolymer as described was prepared wherein the free vinyl acetate concentration was varied in the reaction zone. The various copolymers were then utilized as pour depressants. The results are shown in table I, as follows:

TABLE I.—CONCENTRATION OF VINYL ACETATE IN REACTION MEDIUM IS CRITICAL

[Conditions of Copolymerization: 900 p.s.i.g., 280° F.]

|  | Operations | | |
| --- | --- | --- | --- |
|  | I | II | III |
| Time lapse since the start of copolymerization, hrs | ½ | 2 | 6 |
| Concentration of monomeric vinyl acetate in the reaction medium | 4.1 | 9.7 | 1.9 |
| Pour depression,¹ ° F., .015% wt. concentration | 45 | 70 | 20 |

¹ Base oil—50/50 virgin-cracked gas oil blend, ASTM pour 25° F.

It will be noted from the data in table I that a lower potency pour depressant is manufactured when the concentration of monomeric vinyl acetate in the reaction medium drops below 6 percent. This is true just as much at the beginning as toward the end of polymerization. To prevent such undesirable situations, some vinyl acetate is injected into the reactor prior to the injection of peroxide. For the same reason the reaction is not permitted to proceed in the latter stage to the point of complete vinyl acetate conversion.

EXAMPLE 2

A number of operations were conducted using the process conditions specified wherein the free vinyl acetate concentration was varied as illustrated in the following table II. The temperature was about 310° F. and the pressure about 900 lbs. The promoter was di-t-butyl peroxide. In one operation the free vinyl acetate concentration was about 1.9 weight percent, while in the second operation the free vinyl acetate concentration was 9.7 percent. The molecular weights of the product were determined as well as the concentration of the vinyl acetate in the polymer. The respective copolymers were then tested for the pour depressancy in the base oil with the following results:

TABLE II

|  | Operations | |
| --- | --- | --- |
|  | I | II |
| Free vinyl acetate in benzene solvent, wt. percent | 1.9 | 9.7 |
| Molecular weight of product | 2,400 | 3,000 |
| Percent vinyl acetate in polymer, wt. percent | 41.0 | 36.0 |
| Pour depressancy in base oil,¹ ° F | 15 | 65 |
| Specific viscosity ² | .406 | .285 |
| Percent of additive used in base oil | 0.015 | 0.015 |

¹ Base oil—50/50 blend of virgin and cracked gas oils, ASTM pour 25° F.; boiling range about 366° to 654° F.
² 1% in toluene at 125° F.

From the above it is apparent that the copolymer produced wherein the vinyl acetate concentration was 9.7 percent was far more potent than a copolymer produced with a free vinyl acetate concentration of 1.9 percent. Both copolymers had a relatively high concentration of vinyl acetate.

It is also evident that the polymer produced in operation II has an entirely different type of structure from the polymer produced by operation I. From the molecular weight difference it would be expected that the polymer produced by operation II having a higher molecular weight of 3000 would also have a higher specific viscosity than that produced by operation I, which copolymer had a lower molecular weight of 2,400. It is evident that instead of the specific viscosity of polymer II being higher than the specific viscosity of polymer I, it is lower which clearly points up the fact that the structure of polymer II is entirely different from the structure of the polymer produced by operation I.

EXAMPLE 3

In other tests, operations III and IV were conducted at the conditions specified in example 2. The results of these runs are shown in the following table III.

TABLE III

|  | Operations | |
| --- | --- | --- |
|  | III | IV |
| Free vinyl acetate in benzene solvent, wt. percent | 6.6 | 1.7 |
| Molecular weight of product | 3,300 | 2,100 |
| Vinyl acetate in polymer, wt. percent | 38.0 | 35.0 |
| Pour depressancy in base oil ¹ | 60 | 10 |
| Percent of additive used in base oil | 0.015 | 0.015 |
| Specific viscosity ² | .192 | .159 |

¹ Base oil—50/50 blend of virgin and cracked gas oils; ASTM pour 25° F.; boiling range about 366° to 654° F.
² 1% in toluene at 125° F.

From the above it is apparent that the polymer produced by operation III was far superior in pour point potency than the polymer produced by operation IV. It is also evident that the polymer produced by operation III had an entirely different structure than that produced by operation IV in view of similar specific viscosities despite greatly different molecular weights.

EXAMPLE 4

Additional tests were carried out which are illustrated in the following table IV. It is to be noted that the free vinyl acetate in operation V varies from 3 to 5.6, whereas in operations VI, VII and VIII the free vinyl acetate concentration was constantly maintained in the range in accordance with the present invention.

TABLE IV

|  | Operations | | | |
| --- | --- | --- | --- | --- |
|  | V | VI | VII | VIII |
| Free vinyl acetate in solvent benzene, wt. percent | 3.0–5.6 | 9.7 | 12.0 | 10.0 |
| Molecular weight of product | 1,690 | 3,000 | 4,760 | 4,00 |
| Vinyl acetate in polymer, wt. percent | 25.2 | 36.0 | 41.8 | 47.3 |
| Add .015% ¹ pour depressing potency, ° F | 25 | 70 | 65 | 60 |

¹ Base oil—50/50 blend of virgin and cracked gas oils, ASTM pour 25° F.

From the above it is apparent that the pour point potency of the copolymers produced by operations VI, VII and VIII is far superior to the potency of the copolymer produced by operation V.

EXAMPLE 5

Additional operations were conducted wherein samples were taken from the reaction zone at periodic intervals. In operation IX, samples were taken at the end of 2 and 4 hours and the free vinyl acetate concentration was 2.0 and 1.7 respectively. In operation X, samples were taken at the end of 2, 3 and 6 hours. In operation X the free vinyl acetate concentration was maintained in the range from about 6 to 12 except for E. The results of these operations are shown in table V. (Runs C and D are also shown in table V).

TABLE V. VINYL ACETATE-RICH REACTION MEDIUM REQUIRED FOR SYNTHESIS OF POTENT POUR DEPRESSANT

|  | Copolymerization IX | | Copolymerization X | | |
|---|---|---|---|---|---|
|  | A | B | C | D | E |
| Conditions: | | | | | |
| Ethylene pressure, to maintain p.s.i.g. | 900 | 900 | 900 | 900 | 900 |
| Temperature, °F | 320 | 320 | 280 | 280 | 280 |
| Vinyl acetate at start, G | 50 | 50 | 50 | 50 | 50 |
| 450 g. of vinyl acetate injected over hours | 1 | 1 | 3 | 3 | 3 |
| 35 g. of di-t-butyl peroxide injected over hours | 1 | 1 | 1 | 1 | 1 |
| Benzene, g | 1,200 | 1,200 | 1,200 | 1,200 | 1,200 |
| Product: | | | | | |
| Reactor sampling time, hrs | 2 | 4 | 2 | 3 | 6 |
| Free vinyl acetate, wt. percent | 3.0 | 1.7 | 9.7 | 12.0 | 1.9 |
| Vinyl acetate in copolymer, wt. percent | 27.0 | 35.0 | 36.0 | 41.8 | 41.2 |
| Molecular weight | 2,000 | 2,200 | 3,000 | 4,700 | 3,000 |
| Pour depressing potency, [1] °F. at 0.015 wt. percent | 10 | 15 | 70 | 65 | 20 |

[1] 50/50 virgin cracked gas oil blend, boiling range 366° to 654° F., ASTM pour 25° F.

With respect to the above, it is seen that A has approximately the same vinyl acetate concentration in the polymer as C, namely 37 and 36 percent by weight. On the other hand, the potency of A was only 10° as compared to 70° for C. In operation X wherein the vinyl acetate concentration in E was allowed to fall to 1.9, it is apparent that the potency of the copolymer product dropped appreciably.

A number of additional operations were conducted in accordance with the technique as described. The effect of free vinyl acetate in the solvent as it affects the pour depressing ability of the copolymer product is shown in FIG. 1.

EXAMPLE 6

Additional operations were conducted which show the distinct advantages of maintaining the higher concentration of monomeric vinyl acetate in the reaction zone and the use of superior reaction periods in the range from about 2 to 3 hours. These results are shown in table VI.

TABLE VI.—COMPARISON OF POUR DEPRESSANTS
[Conditions: 900 p.s.i.g., 1,200 g. benzene]

|  | Operations | | |
|---|---|---|---|
|  | XI | XII | XIII |
| Conditions: | | | |
| Vinyl acetate, g./h | 190/3 | 500/3 | 365/2 |
| Peroxide, g./h | 15.8/3¼ | 10/1 | 20/2 |
| Reaction time, hrs | 3½ | 3 | 2 |
| Temperature, °F | 300 | 280 | 300 |
| Product: | | | |
| Yield, g | 575 | 615 | 810 |
| Yield, g./g. vinyl acetate | 3.03 | 1.23 | 2.22 |
| Yield, g./g. peroxide | 36.4 | 61.5 | 40.5 |
| Vinyl acetate in copolymer, wt. percent | 23.8 | 41.8 | 37.2 |
| Unconverted vinyl acetate in benzene, wt. percent | 1.5 | 9.7 | 5.9 |
| Potency [1] at 0.015%, °F | 25 | 60 | 55 |
| Dynamic rust rating (ASTM D-665) refined oil (rating R-6) + 0.025% copolymer | R-3 | R-2 | R-1 |

[1] Base oil—50/50 virgin cracked gas oil blend, boiling range 366° to 654° F., ASTM pour 25° F.

From the above it is apparent that the potency of the copolymers produced in operations XII and XIII were substantially greater than the potency of the polymer produced by operation XI with respect to its pour depressant effect. Operations XII and XIII had a free vinyl acetate concentration in the range from about 6 weight percent to 10 weight percent.

It is also to be noted that the copolymers produced by operations XII and XIII were very effective as rust inhibitors.

While any means of promoting the reaction may be used, it is preferred to use ditertiary butyl peroxide. Other promoters which may be used are, for example: di-lauryl peroxide, dibenzoyl peroxide or t-butyl perbenzoate. Azocompounds such as 2,2'-bisazobutyronitrile likewise may be used. Other means of initiating the reaction may be, for example: X-rays, gamma rays, etc.

Thus it has been discovered that high-potency pour depressants comprising copolymers of ethylene and 3,000 acetate are produced when the reaction medium contains between 4 and 12 weight percent, preferably 6 to 10 percent of free vinyl acetate. This is particularly true when the vinyl acetate concentration in the copolymer is in the range from about 28 to 60 percent by weight, preferably in the range from about 35 to 45 percent by weight. The preferred molecular weights are in the range from about 2000 to 6000, preferably in the range from about 3000 to 5,000.

What is claimed is:

1. In a process for the manufacture of a copolymer consisting of ethylene and vinyl acetate, as a pour point depressant, in which said copolymer contains 28 to 60 weight percent vinyl acetate and has a molecular weight in the range of 2,000 to 6,000, and wherein said ethylene and vinyl acetate are copolymerized in a reactor at a temperature of about 280° to 340° F. under pressure of about 700 to 2,000 p.s.i. in a solvent by a promoter selected from the group consisting of peroxides and azocompounds, characterized by the improvement which consists of charging solvent, vinyl acetate and ethylene to said reactor until the concentration of vinyl acetate in said solvent is 6 to 10 weight percent and the pressure is 700 to 2,000 p.s.i., heating to 280° to 340° F. and then adding promoter to start the polymerization, and thereafter adding additional promoter and vinyl acetate to maintain the concentration of vinyl acetate in said 6 to 10 weight percent range during the course of said reaction while maintaining said pressure of 700 to 2,000 p.s.i. by the addition of ethylene, and maintaining said temperature at 280° to 340° F.

2. A process according to claim 1, wherein said copolymer contains 35 to 45 weight percent vinyl acetate, wherein said solvent is benzene and said initiator is di-tertiary butyl peroxide.

* * * * *